United States Patent Office 3,592,658
Patented July 13, 1971

3,592,658
PROCESS FOR PREPARING STERILIZED
COMMINUTED BEEF PRODUCTS
Gary W. Shults, Milford, Mass., assignor to the United States of America as represented by the Secretary of the Army
No Drawing. Filed Aug. 1, 1968, Ser. No. 749,297
Int. Cl. A23b 1/00; B65b 55/02
U.S. Cl. 99—157                                5 Claims

ABSTRACT OF THE DISCLOSURE

A cooked, comminuted beef pattie sterilized by ionizing radiation containing as additives corn starch, caseinate and salt.

The invention described herein may be manufactured, used, and licensed by or for the Government for governmental purposes without the payment to me of any royalty thereon.

This invention relates to a cooked, comminuted beef product sterilized by ionizing radiation and, more particularly, to a beef product containing minor amounts of corn starch, caseinate and an edible inorganic salt, which product is cooked, packaged in a gas-tight container in the absence of oxygen and sterilized by high energy ionizing radiation.

Sterilization of food stuffs by high energy ionizing radiation offers considerable promise as an alternative to the conventional use of thermal energy for such purposes. Radiation sterilization is sterilization in the "cold," that is, the temperature of the product so sterilized is not increased to any significant degree, whereas thermal sterilization requires that the temperature of the product be raised to a level which will inactivate all microorganisms present or likely to be present therein. Thermal sterilization of food products inherently results in a product which exhibits those characteristics found in a badly over-cooked item, such as, loss of texture, flavor, color, vitamins, etc. To be able to sterilize food items without adversely affecting the properties of such items, as inherently results from thermal sterilization, is presently the goal of many food technologists and processors.

While radiation sterilization does not result in an over-cooked product, there are as yet certain unresolved disadvantages attendant to this processing technique which vary with the product being processed. For example, there have been observed certain objectionable organoleptic changes which affect color and texture and produce off-odors and irradiation flavors. Recent studies have demonstrated that by proper control of certain of the processing variables, it is possible, in some cases, to significantly reduce some or all of these noted objectionable changes.

One food item in common usage which presents special problems in connection with radiation sterilization is precooked comminuted beef. The expression "comminuted beef," as used herein, refers to beef muscle which has been broken up, chopped or ground into small pieces. Comminution of beef results in a product, the texture of which is governed solely by the degree of comminution. Ground beef is but one example of this process, others include chopped beef, finely sliced or chipped beef. In many instances, the comminuted product is formed into portions having the shape of patties, spheres or slabs which are held together by the natural cohesiveness of the product or with the aid of binders, well known in the art.

In order to stabilize comminuted beef items for long term storage at ambient temperatures, it is necessary to inactivate or destroy the proteolytic enzymes and microorganisms normally present in such products. Enzyme inactivation is conventionally accomplished by raising the temperature of the product until the enzyme proteins are denatured. The temperature required to inactivate enzymes is substantially below that required to inactivate some of the potentially harmful microorganisms present in the meat. When the food item is to be sterilized by ionizing radiation, such sterilization normally follows the thermal inactivation of the enzymes.

The trend in food processing is toward convenience foods, and since enzyme inactivation in many cases is accomplished at or near the temperature normally employed in cooking food, it is both desirable and convenient to precook comminuted beef to inactivate proteolytic enzymes and provide a ready-to-eat product. Unfortunately, at those temperatures required to inactivate enzymes or to cook the beef product there results a loss of some of the natural cohesiveness of the raw comminuted beef. Irradiation results in an additional loss of cohesiveness so that without the use of some suitable binder the comminuted product after enzyme inactivation and irradiation will fall apart. Those binders that are conventionally used in the art were tested but were found to be unsatisfactory because they were either adversely affected by the irradiation process or produced undesirable organoleptic changes in the product. Unexpectedly, however, it has been discovered that a combination of three different additives when mixed with the raw comminuted beef can be cooked and sterilized with ionizing radiation to produce an acceptable product which approaches cooked non-irradiated comminuted beef in quality.

The precooked radiation sterilized comminuted beef product of this invention is produced by uniformly mixing comminuted beef muscle with a small amount of corn starch, a caseinate and an edible inorganic salt. The comminuted beef mixture is formed to the desired shape and cooked to an internal temperature within the range of 145° to 175° F. which temperature range is also sufficient to inactivate proteolytic enzymes present therein. The cooked product is inserted within a gas-tight container and sealed in the absence of oxygen. After packaging, the product is then exposed to a dose of high energy ionizing radiation sufficient to destroy all potentially harmful microorganisms that may be present.

Food grade corn starch, one of the additives employed, is a fine white powdery material obtained from corn, that is an odorless, tasteless, carbohydrate having the chemical formula $C_6H_{10}O_5$. The caseinate can be any one of the edible salts of casein, a phosphoprotein obtained from milk such as sodium, potassium and calcium caseinates. The edible inorganic salts used as an additive include preferably sodium chloride and may also include other edible food grade salts, such as potassium and sodium, halides and phosphates. The corn starch, caseinate and inorganic salt are each present in the mixture in an amount ranging from about 0.25% to about 1.0% by weight of the total mixture and preferably in an amount of about 0.5% by weight of the total mixture.

Beef muscle from any grade or cut of beef may be employed in this invention since the comminution process, in effect, tends to reduce the muscle to a more or less uniform texture. The fat content of the meat should not exceed 30% by weight and preferably should be within the range from about 15% to about 30% by weight.

The comminuted beef mixture is formed into the desired shape such as patties or spheres, prior to cooking. Cooking serves the dual function of producing a palatable product and also inactivating the proteolytic enzymes present in beef. Any of the conventional cooking techniques may be employed such as frying or grilling on a hot surface or in hot liquid fat, baking with dry heat, exposure to radiant energy as in broiling, or even boiling. Microwave energy may also be used to cook the product.

A After cooling, the cooked comminuted beef product is inserted within a gas-tight container. Such container may either be rigid, as for example a coated steel can, or flexible as for example a pouch formed of a laminate of polyester, aluminum foil, or polyethylene films. It is preferred that the product be hermetically sealed within the container in the absence of oxygen by employing a vacuum or by flushing with an inert gas such as nitrogen or carbon dioxide.

Sterilization is accomplished by exposing the packaged samples to a sterilizing dose of high energy ionizing radiation. High energy ionizing radiation used in the sterilization of food stuffs as energy levels that range from 750,000 to 10,000,000 electron volts. The types of ionizing radiation that may be employed are well known in the art and may include, for example, particle radiation such as electrons, or electro-magnetic radiation such as gamma rays. It is preferred that the energy level of the ionizing radiation be less than 12,000,000 electron volts in order to avoid any possibility of inducing radioactivity in the material treated. Sterilization of food stuffs normally requires dosages of the ionizing radiation in the range of approximately 3.0 to about 5.6 megarads. Rad is a unit of adsorbed dose of ionizing radiation equal to an energy of 100 ergs per gram of irradiated material.

Irradiation of the samples described in the following examples was accomplished by exposing the samples to gamma radiation from a 900,000 curie Cobalt 60 source. The physical arrangement of the source consisted of a pair of spaced apart parallel plaques which contained the radio isotope. The samples to be treated are placed within stacked aluminum canisters and carried by conveyor between the plaques for a period of time necessary to reach the desired dosage level.

a dose in the range of 4.5 to 5.6 megarads. Following irradiation, the sterilized samples were held at 21° C. until the cans were opened for evaluation of the contents.

After storage for one week, the patties of this example were compared with other patties prepared under identical conditions but which did not contain the three additives. The pattie prepared according to the invention containing the additives were superior to the control patties (no additives) in terms of texture or structure and as determined by a trained panel of food testers in terms of off-odor, irradiation flavor and off-flavor.

EXAMPLE 2

Choice grade, top beef round, 7 days postmortem, having a 20 %fat content by weight was ground through a commercial grinder having a 3/16" plate. Various combinations of additives were mixed with portions of the ground beef and patties were formed as in Example 1. The patties were cooked, packaged and radiation sterilized as in Example 1. After storage for three months at 21° C. the samples were evaluated by two separate panels of trained food testers with eight members in each panel. The samples were evaluated for sensory characteristics such as discoloration, off-odor, irradiation flavor, and off-flavor. The ratings were made on an intensity scale of 1 (non) to 9 (extreme). The average scales of the two panels for each panel are set forth in Table 1. Preference ratings were obtained using a hedonic scale of 1 (dislike extremely) to 9 (like extremely). Preference ratings were also obtained from the panel of taste technologists (expert) and a separate rating obtained from a consumer panel (consumer) consisting of 36 individuals selected at random.

TABLE 1.—FORMULATION OF GROUND BEEF PATTIES
[Testing of additives]

| Sample | Variable | Mean intensity scores | | | | Preference | |
|---|---|---|---|---|---|---|---|
| | | Discoloration | Off-odor | Irradiation flavor | Off-flavor | Expert N-16 | Consumer N-36 |
| 1 | 0.5% salt; 0.5% corn starch | 2.5 | 2.8 | 3.2 | 2.5 | 5.0 | 5.1 |
| 2 | 0.5% salt; 0.5% caseinate | 2.6 | 2.7 | 3.3 | 1.8 | 4.8 | 5.0 |
| 3 | 0.5% corn starch; 0.5% salt; 0.5% caseinate | 1.5 | 2.6 | 2.1 | 2.3 | 5.5 | 5.8 |
| 4 | Irradiation control (no additive) | 1.9 | 2.9 | 2.4 | 1.9 | 5.3 | 5.5 |
| 5 | Non-irrad. control | 1.6 | 1.6 | 1.3 | 1.5 | 6.9 | 6.6 |

The product being sterilized is maintained at a temperature below 0° C. and preferably between −20° C. and −80° C. during the irradiation step. Low temperature irradiation reduces the formation or development of undesirable organoleptic changes in the product.

EXAMPLE 1

Fresh, beef chuck muscle, Choice grade, 5 days from slaughter, with a fat content of 25% by weight was passed through a commercial grinder having a ½" plate. Immediately after grinding, there was added to a 20 lb. portion of the ground beef 3.2 oz. of corn starch, 3.2 oz. of sodium caseinate and 3.2 oz. of sodium chloride. The additives were thoroughly mixed through the mass of ground beef and the mix finally reground through a 3/16" plate to assure an even distribution of the additives. The ground beef mixture is formed into patties 3" in diameter and ½" in thickness by a pattie forming machine.

The patties were placed on a hot metal surface having a surface temperature of 400° F. and cooked for 3 minutes on each side which was sufficient to raise the temperature in the center of the pattie above 160° F. After removal from the grill, the cooked patties were cooled to a temperature of 40° F. and were then inserted into metal cans and sealed under a high vacuum of 2627 inches of mercury. The canned samples were irradiated with gamma radiation from a Cobalt 60 source while held at a temperatrue of −30° C. and received Panel evaluations (Table 1) show that the combination of salt and corn starch or salt and caseinate produce a product that scored significantly lower in preference ratings than did the irradiated control with no additives. Surprisingly, sample 3 was preferred over sample 4 (no additive) and most nearly approached the non-irradiated control in the preference rating. Sample 4 had very poor texture and the patties readily crumbled.

It will be understood that the above embodiments of the invention are illustrative only and that modifications will occur to those skilled in the art. The invention, therefore, is not to be limited to the specific examples disclosed herein but is to be defined by the claims.

I claim:
1. A process for making a sterilized, precooked, shaped comminuted beef product which will maintain its shape after sterilization and cooking consisting of:
   (a) uniformly mixing comminuted beef having a fat content of from about 15% to about 30% by weight with from about 0.25% to about 1.0% by weight of each of corn starch, caseinate, and an edible salt,
   (b) forming said mixture into a desired shape,
   (c) cooking said shaped comminuted beef mixture to an internal temperature from about 145° to about 175° F.,
   (d) sealing said cooked beef product in a gas-tight container in the absence of oxygen, and
   (e) sterilizing said packaged cooked beef product with high energy ionizing radiation to a dosage from about 3.0 to about 5.6 megarads while held at a temperature below 0° C.

2. A process according to claim 1 wherein said caseinate and wherein said edible inorganic salt is sodium chloride.

3. A process according to claim 2 wherein said irradiation dose is in the range of from 4.5 to 5.6 megarads.

4. A process according to claim 3 wherein the amount of each of said corn starch, sodium caseinate and sodium chloride present in the mixture is about 0.5% by weight of the total mixture.

5. A process according to claim 3 wherein said cooked, shaped, comminuted beef mixture is maintained at a temperature between −20° C. and −80° C. during the irradiation step.

References Cited
UNITED STATES PATENTS

| | | | |
|---|---|---|---|
| Re. 23,195 | 2/1250 | Brasch | 99—221X |
| 2,964,409 | 12/1960 | Sair | 99—108 |
| 3,483,005 | 12/1969 | Urbain et al. | 99—217 |

HYMAN LORD, Primary Examiner

U.S. Cl. X.R.

99—108, 174, 187, 217